July 26, 1960     I. B. CLIFFORD     2,946,299
DOUGH MIXER AND KNEADER

Filed Jan. 30, 1958     2 Sheets-Sheet 1

INVENTOR
Ivy B. Clifford
BY *Joseph G. Werner*
ATTORNEY

July 26, 1960   I. B. CLIFFORD   2,946,299
DOUGH MIXER AND KNEADER

Filed Jan. 30, 1958   2 Sheets-Sheet 2

INVENTOR
Ivy B. Clifford

BY *Joseph G. Werner*

ATTORNEY

2,946,299

DOUGH MIXER AND KNEADER

Ivy B. Clifford, New York, N.Y.
(577 Floyd Road, Englewood Cliff, Englewood, N.J.)

Filed Jan. 30, 1958, Ser. No. 712,128

3 Claims. (Cl. 107—38)

This invention relates to improvements in dough mixers and kneaders, and particularly such mixers and kneaders for home use.

An object of this invention is to provide a dough mixer and kneader which will produce a uniformly good product by reducing the human variables in the mixing of ingredients and kneading of dough, at a cost lower than the price of the same quantity of commercially made bread.

A further object of this invention is to produce a dough mixer and kneader which mechanically simulates functions of the human hands and arms in the mixing and kneading of dough.

Another object of this invention is to produce a dough mixer and kneader which reduces the amount of manual exertion required.

An additional object of this invention is to produce a dough mixer and kneader which eliminates the handling of the dough with the hands and provides a single receptacle in preparing dough for baking without the need for bread boards, loose flour and other materials.

A still further object of this invention is to produce a dough mixer and kneader wherein one revolution of the handle mechanically performs one cycle of the manual kneading operations of lifting, folding and pushing away the dough.

Yet another object of this invention is to produce a dough mixer and kneader which reduces the time required for mixing, kneading and placing the dough in pans preparatory to baking, without adversely affecting the activity of the yeast or other ingredients.

These and other objects and advantages of the invention will be apparent from the following description and the accompanying drawings wherein like reference numerals indicate like parts.

Figure 1:
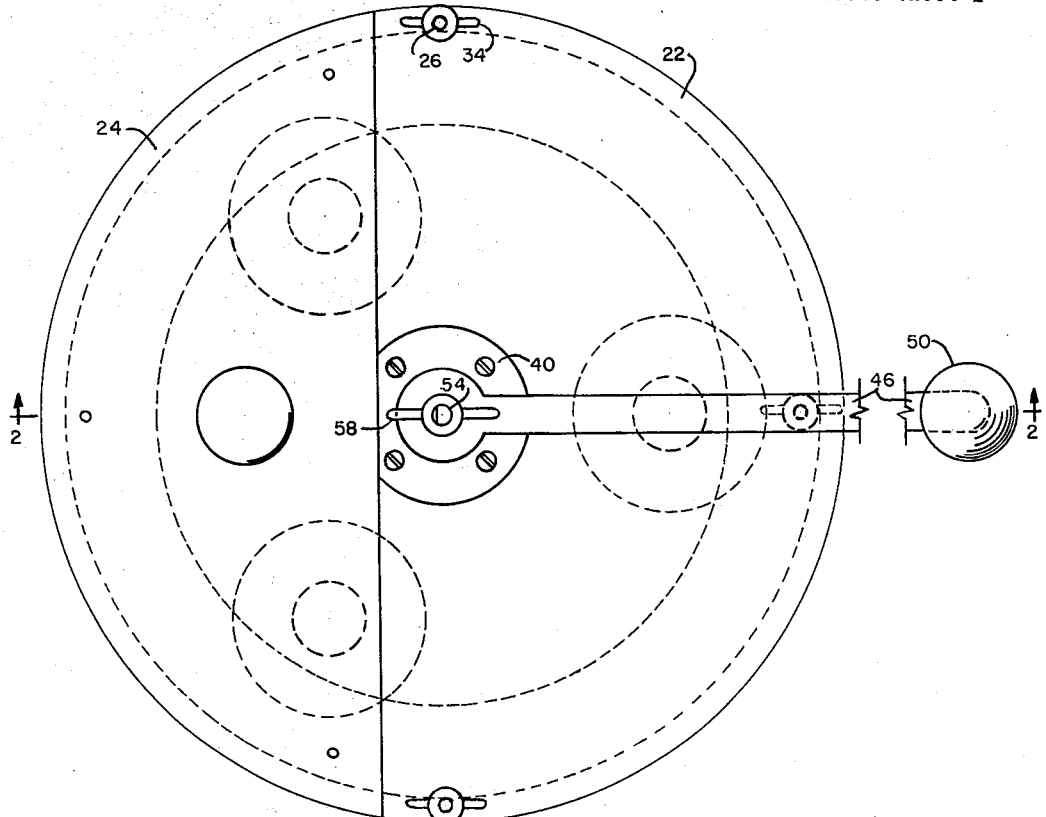
Fig. 1 is a top view of the invention.

Pail or container 10, has sidewall 12 and bottom 14. Secured to bottom 14 by welding or other suitable means is plate 16 which may carry suction cups 18 secured by screws 20 or other means. The lid for the container consists of two sections 22 and 24. Lid section 22 may be secured to container 10 by J-bolts 26 which are anchored to blocks 28 secured to the container by rivets 30, screws, welded or other appropriate means. The upper portion of J-bolt 26 passes through openings 32 of lid section 22 which is tightened down to container 10 by wing-nuts 34. Other conventional clamping devices may be used for retaining lid section 22 securely to container 10.

Figure 3:
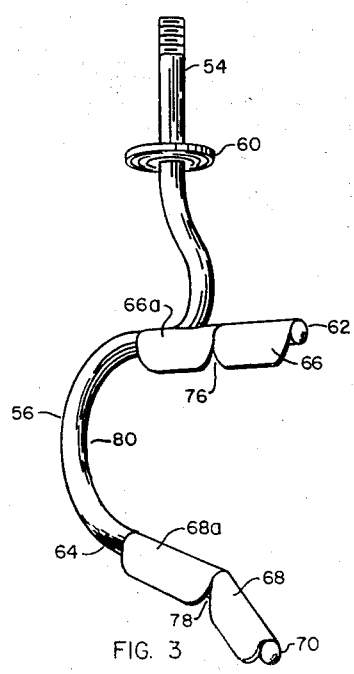
Fig. 3 is a perspective view of the paddle-kneader and stem.
Figure 2:
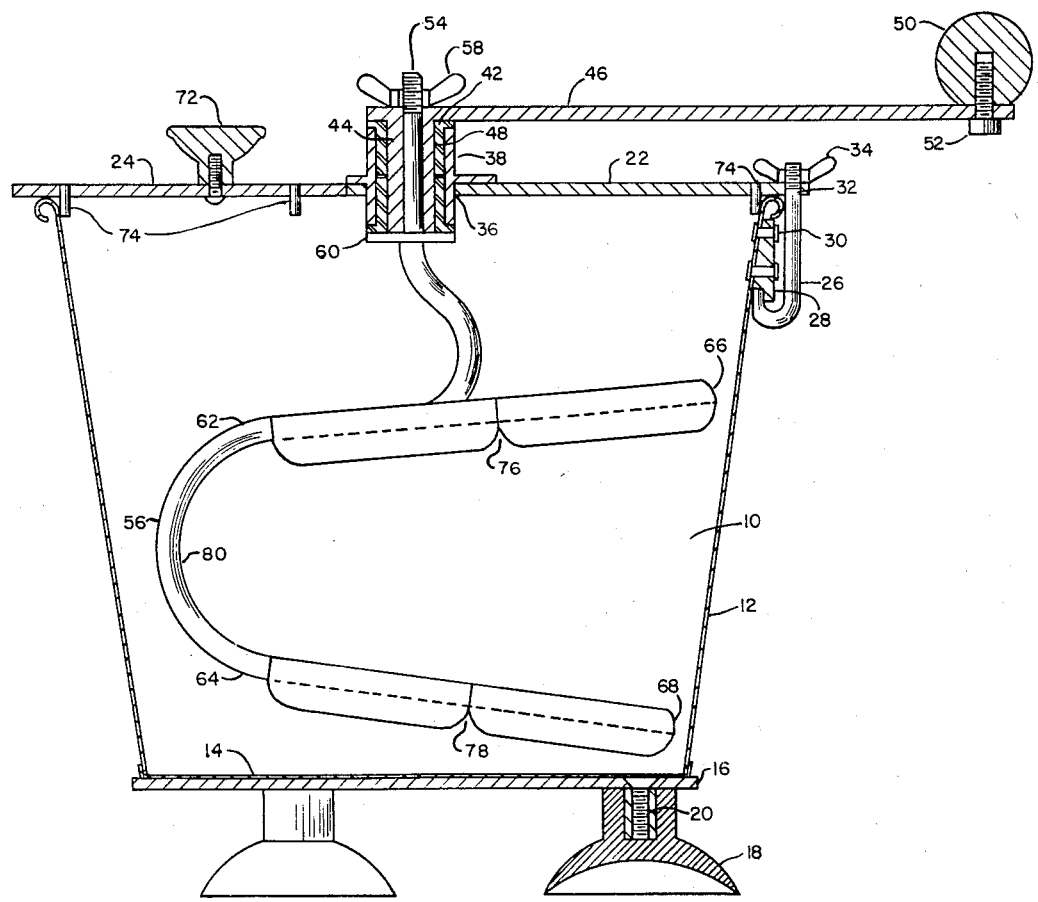
Fig. 2 is a sectional view on line 2—2 of Fig. 1, showing the paddle-kneader.

Lid section 22 has an opening 36 in which are carried bearing housing 38 which is secured to lid section 22 by screws 40 or other means, and bearing 42. Crank end 44 of crank 46 is removably carried in bearing shaft 48. The other end of crank 46 carries handle 50 which is secured to the crank by bolt 52 or other means. Threaded stem 54 of paddle kneader 56 is removably secured to said crank end 44 by wing-nut 58. Collar 60 rests firmly against bearing 42 and crank end 44 when wing-nut 58 is tightened. Stem 54 may be keyed or otherwise securely held in crank pin 44 so that paddle kneader 56 must revolve when crank 46 is turned. Paddle kneader 56 extends downward from collar 60, preferably in a curved manner as shown in Figs. 2 and 3, with bars 62 and 64 carrying a plurality of paddles 66 and 66a and 68 and 68a. The extremity 70 is preferably offset slightly from the vertical plane of paddle kneader 56. It has been found that a set-off of about ¼ inch is practical, though the amount of the set-off may be varied.

Lid section 24 carries knob-handle 72. Both lid sections 22 and 24 carry pins 74 to assist in properly locating the respective lid sections on the container.

Paddles 66 and 66a, and 68 and 68a, respectively, may be in the form of single extended blades, but it has been found that notches 76 and 78 between paddles 66 and 66a, and between paddles 68 and 68a, respectively, more accurately simulate the motion of the human hand in mixing and kneading of the dough. Also, paddle 66 may be omitted, though in the preferred embodiment it is desirable to have both paddles 66 and 66a as shown in Fig. 2 in performing the function of the hand in the kneading process.

The lower and upper edges of paddles 66 and 66a may also be parallel to bottom 14, or parallel to the comparable edges of paddles 68 and 68a, or at a slightly oblique angle as shown in Fig. 2, as may be preferred.

Preferably the outer ends of paddles 66 and 68 and curved bar 80 should be in relatively close relation to the inside of wall 12 as shown in Fig. 2. In a container having a larger diameter at the top than at the bottom, as shown in Fig. 2 the upper paddles 66 and 66a are preferably longer than the lower paddles 68 and 68a. Paddles 68 and 68a, and particularly the outer end of paddle 68 are preferably in relatively close relation to the inside of bottom 14.

Although some attempts have been made to produce bread mixers with the use of rods or wires bent into various configurations, I know of no dough mixer or kneader which has a construction which so closely simulates the movements of the hands and arms of a person manually mixing and kneading dough as mine does. In operation the operator will firmly place the container 10, without the lid sections, on a table, counter or other work space to which the suction cups 18 may become firmly attached to prevent movement of the container during the mixing and kneading process. The water, yeast, sugar and shortening, and then the flour and any other desired solid ingredients, are placed within the container in the usual manner. After the ingredients are placed in the container lid section 22, with paddle kneader 56, is securely attached to container 10 with J-bolts 26, and crank 46 is locked in place over stem 54 with wing-nut 58. Crank 46 may then be turned by handle 50 to mix the ingredients with paddles 68 and 68a until thoroughly mixed into dough. This mixer has been designed so that in approximately 2 to 3 minutes, the thoroughness of dough mixing is indicated by dough being in a ball with all dough being removed from the sides of container by the operation. Lid section 24 may then be placed on the container, and the container containing the dough, and the assembly of the kneader paddle 56 and the lid section 22 attached thereto, may be left in the usual warm place while the dough rises.

When the dough has risen to the proper lightness, which may be to the top of the container, it is ready for kneading. The dough is kneaded in the container by turning the handle 50 of the paddle kneader 56 in a steady manner. As the paddles 66, 66a, 68 and 68a are turned around the central pivot of stem 54 they simulate the action of the hands and arms in the manual kneading of dough which consists of the operations of (1) lifting a portion of the dough, (2) folding it over on the dough below, (3) pushing the dough lightly with the heels of palms of the hands, and (4) gradually turning the entire mass of dough over in the course of the process.

The paddles 66 and 66a lift or push a portion of the dough and fold it over on the dough below it, just as the first and second operations of manual kneading. Paddles 68 and 68a, along with paddles 66 and 66a, then push the dough gently just as the heel of the palms of hands, and at the same time the whole mass is gradually turned as the crank 46 is turned. It will be noted that notches 76 and 78 cause paddles 66 and 66a and 68 and 68a, respectively, to resemble the shape and appearance of the butt of the palm of a hand, which also has a slight notch between the fleshy portions of the palm.

One revolution of the crank and the paddle kneader produces approximately the same results as the four steps of a complete cycle of kneading with the hands.

The operator continues to turn the handle for a short time until the dough becomes a large combined mass and no longer sticks to the inside wall 12 of container 10, which can be observed by raising lid section 24. The wing-nut 58 is then loosened, crank 46 removed and lid section 22 removed by loosening the J-bolts 26. The paddle kneader 56 is then removed from the dough. The dough may then be cut with a lightly greased knife into the desired number of loaves. The loaves of dough are removed from the container 10 with greased hands, properly shaped and placed in conventional baking pans in which they are baked.

It is thus seen that by carrying on the complete operation of mixing the ingredients, permitting the dough to rise, and kneading the dough, all in the container, it is unnecessary to have a bread board with loose flour during the mixing process and then again during the kneading process. The time required in cleaning up the flour and bread board is eliminated. The physical exertion required for mixing and kneading is greatly reduced by the mere turning of a handle for a shorter period than is usually required by hand kneading. And, of primary importance is the fact that the paddle kneader, having the shape of the heels of palms of hands, simulates the action of a person's hands and arms in kneading the dough, as to produce a superior baked product. Moreover, this result is accomplished without any handling of the dough with the hands until it is placed in the baking pans, and without damage to the yeast.

It is well known, of course, that a person making bread or other baked goods will have variations in the resulting product by reason of differences from batch to batch in which he or she manually mixes and kneads the bread. Such variations in the product are substantially eliminated by reason of the paddle kneader which mechanically mixes and kneads the dough in the same manner every time.

While I have illustrated and described a preferred embodiment of the present invention, it will be understood, however, that various changes and modifications may be made in the details thereof without departing from the spirit and scope of the invention as set forth in the appended claims.

I claim:

1. In a dough mixer and kneader, a paddle kneader with a mounting to turn on a vertical axis, a substantially straight shaft extending transversely from said mounting carrying an upper paddle having substantially vertically disposed blades, a downwardly curved connecting shaft extending from one end of said upper shaft and connected to one end of another shaft carrying a lower paddle having like blades, a portion of said lower paddle being in substantially the same vertical plane as the upper paddle, a reversed V-notch in the lower edge of each of said blades approximately midway between the ends of said blades.

2. In a dough mixer and kneader, a paddle kneader with a mounting to turn on a vertical axis, a substantially straight shaft extending transversely from said mounting, said shaft extending in opposite directions from said mounting at the point of connection therewith and carrying an upper paddle, a downwardly curved connecting shaft extending from one end of said upper shaft and connected to one end of another shaft carrying a lower paddle, a portion of said lower paddle adjacent said connecting shaft being in substantially the same vertical plane as the upper paddle.

3. In a dough mixer and kneader, a paddle kneader with a mounting to turn on a vertical axis, a substantially straight shaft extending transversely from said mounting carrying a substantially straight upper paddle, a downwardly curved connecting shaft extending from one end of said upper shaft and connected to one end of another shaft carrying a lower paddle, a portion of said lower paddle adjacent said connecting shaft being in substantially the same vertical plane as the upper paddle and the outer extending portion of said lower paddle being offset from said vertical plane.

References Cited in the file of this patent

UNITED STATES PATENTS

| | | |
|---|---|---|
| 354,104 | Deam | Dec. 14, 1886 |
| 663,795 | Stevens | Dec. 11, 1900 |
| 723,977 | Barney | Mar. 31, 1903 |
| 842,509 | Woodruff | Jan. 29, 1907 |
| 850,991 | Abbott | Apr. 23, 1907 |
| 977,395 | Norton | Nov. 29, 1910 |
| 1,011,883 | Cartwright | Dec. 12, 1911 |
| 1,026,355 | Hudson | May 14, 1912 |
| 1,116,001 | Anderson | Nov. 3, 1914 |
| 1,144,749 | Beck | June 29, 1915 |
| 1,196,932 | Carpenter et al. | Sept. 5, 1916 |
| 1,298,544 | Montalto | Mar. 25, 1919 |
| 1,723,194 | Meyer | Aug. 6, 1929 |
| 2,736,537 | Nelsson | Feb. 28, 1956 |
| 2,898,094 | O'Neill | Aug. 4, 1959 |

FOREIGN PATENTS

| | | |
|---|---|---|
| 359,561 | Germany | Sept. 23, 1922 |